Patented Apr. 7, 1942

2,278,637

UNITED STATES PATENT OFFICE 2,278,637

RESIN OF INTERPOLYMERIZED SUBSTANCES COMPRISING ACRYLIC OR METHACRYLIC ANHYDRIDE

Carl E. Barnes, Worcester, Mass., assignor, by mesne assignments, to E. I. du Pont de Nemours & Company, Wilmington, Del., a corporation of Delaware No Drawing. Application November 9, 1939, Serial No. 303,708

4 Claims. (Cl. 260—84)

This invention relates to synthetic resins and more particularly to interpolymerized compounds containing unsaturated methylene groups.

It has been found that various monomeric unsaturated methylene compounds, such as methyl methacrylate, polymerize to form highly transparent and tough resins. But such compounds may have too low a softening point or they may be too easily scratched for various special uses. These substances may, however, have their hardness increased and their softening point raised by interpolymerization with acrylic anhydride and methacrylic anhydride. These anhydrides contain two independently polymerizable unsaturated methylene groups per molecule; and during polymerization with another substance containing but one of these groups, the growing chains incorporate molecules of both substances and form an interpolymer having a three dimensional structure wherein the linkages are established between the chains to an extent depending upon the amount of cross linking agent used. These anhydrides are very active cross linking agents and make very hard and satisfactory bodies for many uses. It is, however, often desirable to produce resins which are both hard and stronger than those produced by such a cross linking agent, or to modify other characteristics of the copolymer, such as its softening point or solubility, without losing the desirable properties imparted by the anhydride.

It is the primary object of this invention to provide a copolymer of various base substances with modifying agents which will provide desired properties relating to strength, hardness, solubility and softening point without developing strains and cracks therein and thus making a body which is suitable for use in various fields.

A further object is to modify the properties of a chosen base substance and provide a brilliant transparent resin which can be readily shaped and polished so as to give a satisfactory optical image. Further objects will be apparent in the following disclosure.

In accordance with this invention, I propose to copolymerize various base substances containing a single unsaturated methylene group with acrylic or methacrylic anhydride in a limited amount of not over 7 to 10% by weight which is sufficient to impart desired hardness characteristics thereto and with a compatible and miscible amount of a further modifying agent which improves the strength or desirable properties. The base substances comprise:

The methyl and ethyl esters of acrylic and methacrylic acids, i. e., methyl acrylate, ethyl acrylate, methyl methacrylate and ethyl methacrylate;

Methyl vinyl ketone, methyl isopropenyl ketone and styrene.

As a modifying agent for changing and improving the properties of the resin formed by the other two substances, I employ the allyl and the methallyl esters of acrylic acid and methacrylic acid, i. e., Allyl acrylate

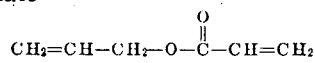

Methallyl acrylate

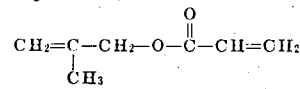

Allyl methacrylate

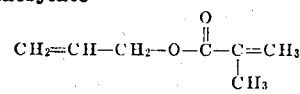

Methallyl methacrylate

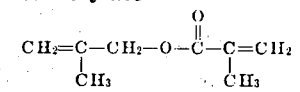

The acrylic and methacrylic anhydrides are desirable cross linking and hardening agents for interpolymerization with the various base substances above listed, and particularly with methyl methacrylate. But, if only 7 to 10% of the cross linking agent, such as methacrylic anhydride, is used, the cross linkages between the chains may be too infrequent to give a required strength or a high enough softening point or a sufficiently low solubility for many uses and particularly in the optical field. I have found that allyl methacrylate and the above mentioned homologues will strengthen the copolymer, raise its softening point and reduce its solubility and thus render it much better for use as an optical lens. Moreover, these allyl compounds have the peculiar property of providing a more brilliant optical surface. That is, the triple polymer containing the base substance copolymerized with both the acrylic anhydride or homologue and the allyl methacrylate or homologue may be polished quickly and accurately by a grinding and buffing operation, and the final product gives a very clear optical image.

It is to be observed that allyl alcohol may be considered as vinyl methyl alcohol, hence the acrylic or methacrylic acid ester contains two unsaturated methylene groups $CH_2=$ and so can serve as a cross linking agent. It is found, however, that allyl and methallyl acrylate and methacrylate act differently from methacrylic anhydride and other cross linking agents of that character. This is believed to be due to the peculiarity of the allyl group, which does not polymerize directly by itself and only as it is activated by the methacrylate end of the molecule. Hence, the allyl group is a weak second cross linking group helping to make a three dimensional structure but forming less cross linkages than do the $CH_2=$ groups of the anhydride. The final product has less strain therein because of this reduced number of cross linkages and yet is stronger or harder or has a higher softening point than if the allyl ester were not used. Pure allyl methacrylate polymerized by itself shows some strain and may have a few large cracks therein, but it is not full of cracks as is methacrylic anhydride when polymerized by itself. Hence, I may utilize the acrylic or methacrylic anhydride as a cross linking agent proportioned within its ability to increase the hardness without forming a highly strained condition and I use the allyl and methallyl esters of acrylic and methacrylic acids to increase or modify the strength, raise the softening point or decrease the solubility of the product to produce a desired product for use as an optical body, an abrasive bond or a molded substance of various utilities. The latter is used in an amount which forms a fully miscible monomeric liquid and provides a substantially homogeneous resin, and I ordinarily use not over 50% of the allyl ester and preferably about 10 to 20%, although lesser amounts are often desirable.

As specific examples illustrating various phases of this invention, I may make a triple polymer for use as an optical body comprising methyl methacrylate copolymerized with 7% of methacrylic anhydride and 15% of allyl methacrylate, which are miscible in their monomeric liquid forms and may be polymerized by standard procedure, such as heating the mixture in a mold at 60° C. The product is a transparent hard body that is not strained or cracked detrimentally. As a further example, I may copolymerize methyl methacrylate with 5% of methacrylic anhydride and 20% of methallyl methacrylate to form a similarly useful body. I may use much smaller proportions of the methacrylic anhydride and larger amounts of the allyl ester or vice versa, as required to form different types of resins for use as abrasive bonds and molded articles of various utilities.

It will now be appreciated that one may substitute the other above listed monohydric alcohol esters of the acrylic and methacrylic acids for the methyl methacrylate given in the examples. Likewise, styrene, methyl vinyl ketone and methyl isopropenyl ketone are particularly useful as base substances and they may be brought to that degree of hardness and strength which renders them fit for use as optical bodies, abrasive bonds and molded bodies, etc., by being hardened with acrylic or methacrylic anhydride up to the limit of about 10% of the anhydride and by having their properties further modified by the use of up to about 50% of the allyl and methallyl esters of acrylic and methacrylic acids. The proportions above specified will serve for each of the base substances, but they may be varied widely.

The interpolymers may be used for bonding various types of granular materials, such as abrasive grains, and in such cases the proportion of the modifying agents employed will be governed by the requirements of the final product. If abrasive grains, such as crystalline alumina, silicon carbide, boron carbide or diamonds, are to be bonded by the interpolymer, the mixture of chosen monomeric substances may be incorporated with the grain in desired proportions and the bond polymerized by heat, with or without the aid of catalysts, such as benzoyl peroxide. Suitable procedure may be adopted for making such bonded articles in accordance with the methods set forth in the applications of Kistler and Barnes Serial No. 187,549 filed January 28, 1938, and Serial No. 228,004 filed September 1, 1938. For example, a grinding wheel may be made by placing a desired amount of the abrasive grains in a mold and then pouring into the mold a sufficient amount of the bond mixture to fill the interstices between the grains, after which the mold is subjected to heat for polymerizing the bond in place. Also, the monomeric polymerizable mixture may be used only in sufficient amount to wet the grains and be solidified by polymerization in the presence thereof. Other suitable procedures as set forth in prior applications may be employed with the base substance and the modifying agents herein disclosed and this invention is deemed to cover the products thus made.

It is to be understood that while I have attempted to explain this invention in the light of the present accepted theories, yet the claims are not to be construed as dependent on any particular theory relative to the formation of these copolymers. Also, the examples above given are to be interpreted solely as illustrating the invention and not as limitations thereon, except as set forth in the claims appended hereto.

This case is a continuation in part of my copending application Serial No. 253,625 filed January 30, 1939.

I claim:

1. A resin formed of copolymerized substances comprising styrene interpolymerized with not over 10% of a substance selected from the group consisting of acrylic and methacrylic anhydrides and further polymerized with not over 50% of a substance selected from the group consisting of the esters of the acrylic and methacrylic acids with allyl and methallyl alcohols.

2. A resin formed of copolymerized substances comprising methyl methacrylate with not over 10% of methacrylic anhydride and a miscible amount of allyl methacrylate.

3. A resin formed of copolymerized substances comprising methyl methacrylate, not over 10% of methacrylic anhydride and a miscible amount of methallyl methacrylate.

4. A resin formed of copolymerized substances comprising not over 10% by weight of an anhydride of an acid selected from the group consisting of acrylic and methacrylic acids, copolymerized with a substance from the group consisting of the esters of acrylic and methacrylic acids with allyl and methallyl alcohols, and with a compatible polymerizable unsaturated monomethylene compound which constitutes the major portion of the mass and forms a homogeneous resin.

CARL E. BARNES.